United States Patent [19]

Katz

[11] Patent Number: 4,624,346

[45] Date of Patent: Nov. 25, 1986

[54] MULTI-RATIO HYDRAULIC ENERGY DISSIPATER

[75] Inventor: Maurice Katz, Paris, France

[73] Assignee: Creusot-Loire, Paris, France

[21] Appl. No.: 630,169

[22] Filed: Jul. 12, 1984

[30] Foreign Application Priority Data

Jul. 20, 1983 [FR] France .............................. 83 11941

[51] Int. Cl.⁴ .......................... F61F 9/50; B60G 17/08
[52] U.S. Cl. .................................. 188/282; 188/289;
188/315; 188/317; 188/322.15
[58] Field of Search .............. 188/289, 317, 318, 319,
188/322.14, 322.15, 322.13, 269, 282, 298, 315;
267/8 A, 64.18, 64.19, 64.22, 64.23-64.24,
64.27; 213/43, 8

[56] References Cited

U.S. PATENT DOCUMENTS

| 1,655,786 | 1/1928 | Guerritore | 188/289 |
| 2,069,791 | 2/1937 | Wallace | 188/289 X |
| 3,003,595 | 10/1961 | Patriquin | 188/289 X |
| 3,216,535 | 11/1965 | Schultze | 188/289 X |
| 3,218,052 | 11/1965 | Peterson | 188/289 X |
| 3,679,069 | 7/1972 | Shaver et al. | 188/298 X |
| 3,706,362 | 12/1972 | Faure | 188/282 |

FOREIGN PATENT DOCUMENTS

| 1455951 | 2/1969 | Fed. Rep. of Germany | 188/289 |
| 1214167 | 4/1960 | France | 188/289 |

Primary Examiner—Douglas C. Butler
Attorney, Agent, or Firm—Pollock, Vande Sande & Priddy

[57] ABSTRACT

An hydraulic energy dissipater with multiple working ratios, of the telescopic type, comprising a member with a variable cross-section, penetrating into a bore provided on the bottom of a piston and into a chamber provided inside the rod of the piston, which controls, as a function of its position with respect to the bore, the passage of fluid between two working chambers, either through weakly loaded valves or through more strongly loaded valves. The invention is applied more especially to the damping of yaw movements of bogies of railway rolling stock.

5 Claims, 5 Drawing Figures

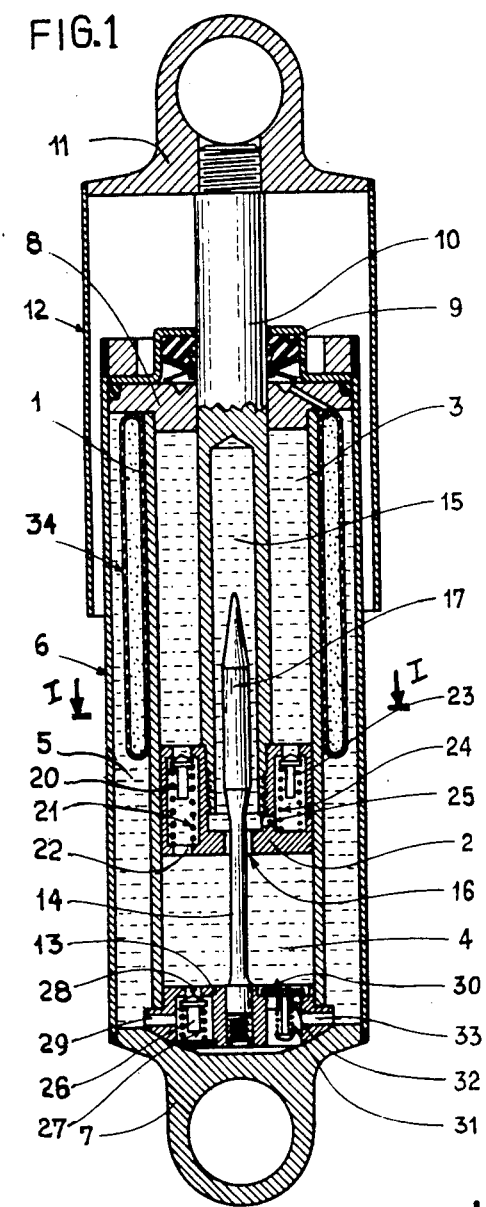
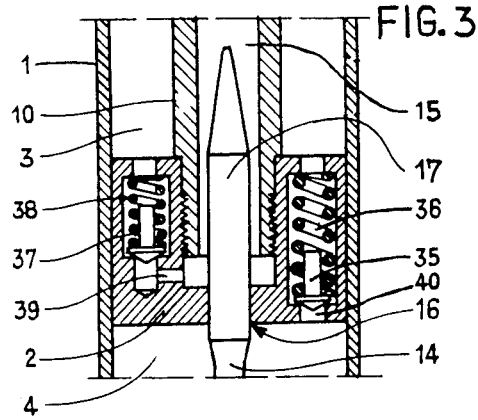
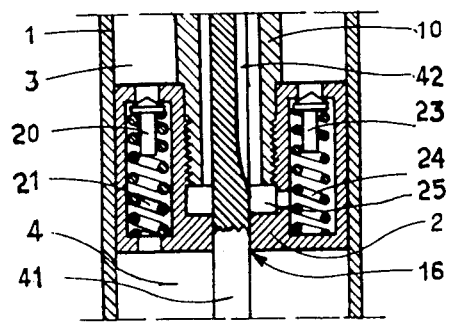
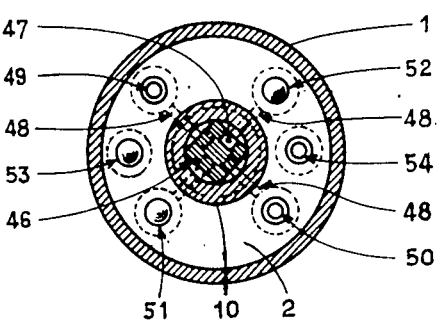
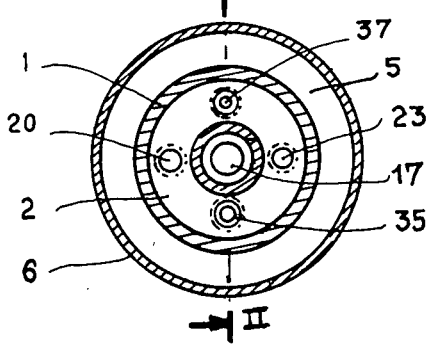

MULTI-RATIO HYDRAULIC ENERGY DISSIPATER

FIELD OF THE INVENTION

The present invention relates to an hydraulic energy dissipater with multiple working ratios, of the telescopic type.

This kind of hydraulic energy dissipater with multiple operating ratios is more particularly intended for the braking of yaw movements of bogies of railway rolling stock, but can also be applied to the suspensions of vehicles whose loads vary within very wide limits, as well as to jack-dampers of controls which must act differently in various parts of their strokes.

BACKGROUND OF THE INVENTION

It is known, in fact, that the yaw movements of a bogie, consisting of a slow rotation from one side to the other, around its pivot on which the body has been articulated, necessitate considerable braking in a straight line and much less intense braking on a curve, which contradictory requirements have until now not been solved other than by unsatisfactory compromises in the two cases.

As regards a suspension of a vehicle with a large load variation, the braking force, generally proportional to the speed and to the square root of the mass, becomes very unsatisfactory under load if it has been regulated for operation empty, and vice versa.

In another case, which is, for example, that of jacks of machine controls, it is often advantageous to modulate the forward speed of approach and of working by suitable braking, as a function of the various phases of the operation.

SUMMARY OF THE INVENTION

It is an object of the present invention therefore to provide a different ratio hydraulic braking, according to the position of the stroke, and this in both directions of movement and independently of the speed.

The invention applies to an hydraulic dissipater of energy of the telescopic type comprising:

(a) a working cylinder filled with liquid and divided into two chambers by a piston provided with spring valves calibrated strongly or calibrated more weakly, determining the hydraulic resistances or ratios in the course of the movements transmitted by a rod bearing said piston, and (b) an annular compensating chamber surrounding the working cylinder, and communicating through a valve and a calibrated valve with the working chamber opposite the rod of the piston.

According to the invention, the dissipater comprises a member of variable cross-section, penetrating into a bore provided on the bottom of the piston and into a chamber provided inside the rod of the piston, which governs, as a function of its position with respect to said bore, the passage of the liquid between the two working chambers, namely through the weakly loaded valves or through the more strongly loaded valves.

BRIEF DESCRIPTION OF THE DRAWINGS

The invention will be better understood with the aid of the description which follows referring to particular embodiments given purely by way of example and with reference to the accompanying drawings in which FIG. 1 is a view in axial section of an hydraulic energy dissipater with two damping ratios, in the two directions of movement, according to the invention.

FIG. 2 is a view in section along line I—I of FIG. 1,

FIG. 3 is a view in partial axial section on a larger scale along the line II—II of FIG. 2.

FIG. 4 is a partial axial section of a second embodiment of the invention; and

FIG. 5 is a partial cross-section of a third embodiment of the invention.

DETAILED DESCRIPTION

Referring first to FIG. 1, the hydraulic energy dissipater with two braking ratios in the two directions comprises a working cylinder 1, divided by piston 2 into two chambers 3 and 4 and surrounded by an outer tube 6, forming with it an annular compensating chamber 5. An elastic jacket 34 filled with gas compressed under low pressure is placed inside the annular compensating chamber 5. The outer tube 6 is closed at its lower portion by a coupling 7, and at its upper part by a counter-piston 8 bearing a fluid-tight seal 9.

A base 13 resting on the coupling 7 and closing the chamber 4 comprises a valve 26 loaded by a calibrated spring 27, enabling the liquid, from a certain pre-determined pressure, to pass from the chamber 4 to the compensating chamber 5, through the orifices 28 and 29. A valve 30, held in closed position by a weak spring 31, enables liquid to pass easily in the reverse direction, i.e., from the chamber 5 to the chamber 4 through the passages 32 and 33, under the effect of the aspiration of the piston 2 and the thrust of the elastic jacket 34, thus rendering possible the operation of the dissipater in all positions, and particularly the horizontal, corresponding, for example, to the yaw movements of bogies.

Piston 2 is fixed to the lower end of a rod 10 which passes through the counter-piston 8 and which comprises, at its outer end, a coupling 11 and a protective housing 12. In the rod 10 is provided an inner chamber 15 communicating with the chamber 4 through a bore 16 formed at the bottom of the piston 2.

The base 13 bears in its center a needle 14 with variable profile which, according to the movement, penetrates more or less into the chamber 15 through the bore 16. The needle 14 possesses a central cylindrical portion 17 of cross-section equal to that of the bore so as to plug the latter along a part of its travel while the cylindrical portions on each side of the central portion 17 have a cross-section less than that of the bore 16 in order to establish free communication between the chambers 4 and 15.

The piston 2 (FIGS. 1, 2 and 3) is provided on the one hand with valves (20,23) allowing the fluid to pass from the chamber 3 to the chamber 4 in the course of an extension movement and on the other hand valves (35,37) allowing the fluid to pass from the chamber 4 to the chamber 3 in the course of a compression movement. The valve 20 with the strongly calibrated spring 21 opens directly to the chamber 4, through an orifice 22, and the valve 23 with spring 24, calibrated more weakly, opens to the chamber 15 through a passage 25. The valve 35, (FIG. 3), loaded by a strong spring 36 enables liquid to pass from the chamber 4 to the chamber 3 through an orifice 40, from a pre-determined pressure, and the valve 37, loaded by a more weakly calibrated spring 38, places the chambers 3 and 15 in communication through a passage 39.

The operation of the multiple ratio hydraulic dissipater is as follows: When a pulling force is applied to the coupling 11, the needle 14 finds itself with respect to the piston in the position shown in FIG. 1, the liquid is compressed in the chamber until the opening of the valve 23 weakly loaded by the spring 25. At this moment, the liquid passes from the chamber 3 to the chamber 4 through the passage 25 and the bore 16 which is open, whence a reduced resistance. The pulling movement continuing, the central portion 17 of the needle 14 comes to block the bore 16, thus preventing the liquid from passing through the valve 23 which is then neutralized; through this fact, the pressure of the liquid in the chamber 3 rises until it can open the valve 20 loaded more strongly by its spring 21, whence an increased hydraulic resistance and a higher braking ratio. The movement continuing still in the same direction, the needle 14 emerges entirely from the bore 16, which has the effect of closing the valve 20 and again opening the weaker valve 23; the liquid thus finds easier passage, through this valve 23, the passage 25 and the bore 16, from the chamber 3 to the chamber 4, resulting again in weak resistance.

Upon compression movement (FIG. 3), the chamber 4 being entirely filled with liquid through the valve 30, liquid passing first through the bore 16, still disengaged, through the passage 39, and the valve 37, more weakly loaded, the hydraulic resistance is then reduced. As soon as the central portion of the needle 14 closes the bore 16, the liquid can only find a passage from the chamber 4 to the chamber 3 only through the valve 35, strongly loaded by spring 36, thus causing a rapid increase in the resistance. The compression movement continuing, the central portion 17 of the needle 14 frees the bore 16 and re-establishes again the passage of the liquid through the valve 37, whence a reduction in the hydraulic resistance to the weaker ratio.

In both cases, the valve 26, loaded by the spring 27, suitably calibrated, can only allow to pass, through the orifice 29, the surplus of the liquid, corresponding to the volume of the driven-in rod 10, to the compensating chamber 5, in order to ensure first total filling of the chamber 3, necessary for the braking of the next expansion movement.

There is hence obtained, as a function of the magnitude of the traction or compression movement exerted on the dissipater, a succession of reduced or higher braking ratios.

In the embodiment shown in FIG. 4, the piston 2 also comprises the two valves 20 and 23 loaded respectively by the calibrated springs 21,24, arranged like those of FIG. 1, so as to govern the passage of the liquid from the chamber 3 to the chamber 4, particularly in the case of extension movements. In the direction of compression, the piston comprises the two loaded valves oriented in reverse direction, like those of FIG. 3, to control, in the same way, the passage of the liquid from the chamber 4 to the chamber 3. In this case, the needle, with variable profile, is replaced by cylindrical rod 41, bearing one or several grooves 42 over a part of its length, so as to open or close the passage of the liquid along the stroke, through the bore 16 of the piston 2. The operation of this modification is in all points similar to that described for FIG. 1, the cylindrical rod 41 provided with grooves 42 causing, according to its position with respect to the bore 16, the opening of the weakly or strongly loaded valves, to obtain a more or less considerable braking in the direction of traction or of compression.

In FIG. 5, the control rod is a square rod 46, provided on each of its four longitudinal surfaces, with suitably arranged grooves 47. The operation consists also of obstructing or disengaging orifices 48, opening directly on the four surfaces, to place in communication the two working chambers, separated by the piston 2, successively, either through the valves 49 and 50, less loaded, or again through the valves 51 and 52, the most weakly loaded. There are thus obtained in each direction three different braking ratios. With a rod 46, of hexagonal or octagonal cross-section, there would respectively be obtained four or five different ratios, etc.

Valves 53 and 54, the most heavily loaded, and opening directly, can be also controlled by the rod 46.

A rod of round section, bearing numerous grooves in the direction of its length over selected portions of travel, can also replace a polygonal rod, provided that it is immobilized in rotation with respect to the piston.

I claim:

1. Hydraulic energy dissipater providing different braking ratios particularly intended for the braking of yaws of bogies, comprising
   (a) a working cylinder filled with fluid and divided into upper and lower chambers by a piston, said piston being carried by a piston rod and being provided with two sets of valves, each set allowing the fluid to pass from one of said chambers to the other and comprising at least one first valve strongly loaded by a calibrated spring and one second valve weakly loaded by a calibrated spring;
   (b) an annular compensating chamber surrounding said working cylinder and communicating through a valve and a loaded valve with said lower chamber so as to enable fluid to pass between said compensating chamber and said lower chamber upon attainment of predetermined pressures; and
   (c) a member mounted on the bottom of said working cylinder and penetrating through a bore provided on the bottom of said piston into a chamber provided inside said piston rod, said member comprising portions of at least two different cross-sections, the first of said cross-sections being equal to that of said bore, the second of said cross-sections being less than that of said bore, said portion having said first cross-section being moved into positions respectively blocking and opening said bore by traction and compression forces applied to said dissipator;
   (d) whereby said fluid is forced to pass through said at least one strongly loaded valve when said piston moves in a predetermined portion having said first cross-section centered on the initial position of said piston, a high braking ratio being then obtained, and to force it to pass through said at least one weakly loaded valve when said piton moves in a portion different from said predetermined portion, a low braking ratio being then obtained.

2. Hydraulic energy dissipater according to claim 1, wherein said member is constituted by a cylindrical rod comprising a central portion having said first cross-section and, on each side of said central portion, cylindrical portions having said second cross-section.

3. Hydraulic energy dissipater according to claim 1, wherein said member is constituted by a cylindrical rod having said first cross-section comprising a central portion of full section and one each side of said central portion longitudinal grooves with a constant cross-section.

4. Hydraulic energy dissipater according to claim 1, wherein said member is constituted by a polygonal rod whose surfaces are directly in contact with outlet orifices of said at least one weakly loaded valve and comprise, grooves of predetermined lengths for actuating the corresponding valves.

5. Hydraulic energy dissipater according to claim 1, wherein said at least one strongly loaded valve communicates directly with one of said upper and lower chambers.

* * * * *